United States Patent
Chao

(10) Patent No.: US 7,555,382 B2
(45) Date of Patent: Jun. 30, 2009

(54) METHOD OF PROVIDING RETURN ROUTE FOR GLOBAL POSITIONING SYSTEM DEVICE

(75) Inventor: Pi-Chun Chao, Taipei County (TW)

(73) Assignee: Mitac International Corp., Taoyuan (TW)

( * ) Notice: Subject to any disclaimer, the term of this patent is extended or adjusted under 35 U.S.C. 154(b) by 870 days.

(21) Appl. No.: 10/907,191

(22) Filed: Mar. 24, 2005

(65) Prior Publication Data

US 2005/0222759 A1    Oct. 6, 2005

(30) Foreign Application Priority Data

Mar. 31, 2004    (TW) .............................. 93108815 A

(51) Int. Cl.
*G01C 21/00*    (2006.01)
*G01C 21/30*    (2006.01)

(52) U.S. Cl. ...................... 701/201; 701/202; 701/208; 701/209

(58) Field of Classification Search ................. 701/201, 701/202, 208, 209
See application file for complete search history.

(56) References Cited

U.S. PATENT DOCUMENTS

| | | | |
|---|---|---|---|
| 2003/0050751 A1* | 3/2003 | Fukushima et al. | 701/202 |
| 2004/0102899 A1* | 5/2004 | Kaji et al. | 701/210 |
| 2004/0148096 A1* | 7/2004 | Katou | 701/201 |
| 2004/0220729 A1* | 11/2004 | Park et al. | 701/209 |
| 2008/0109153 A1* | 5/2008 | Gueziec | 701/117 |

FOREIGN PATENT DOCUMENTS

WO    WO 03/040654    *    5/2003

* cited by examiner

*Primary Examiner*—Khoi Tran
*Assistant Examiner*—Bhavesh Amin
(74) *Attorney, Agent, or Firm*—Quintero Law Office

(57) ABSTRACT

A method of providing a return route for a global positioning system (GPS) device is provided. When the starting point and the destination of the return route are exactly opposite to the original starting point and the destination, the GPS device plans and provides a reverse route without re-setting the starting point and the destination all over again, and therefore the time of obtaining a return route can be substantially reduced. The efficiency of the GPS device in planning routes can be effectively promoted.

8 Claims, 1 Drawing Sheet

METHOD OF PROVIDING RETURN ROUTE FOR GLOBAL POSITIONING SYSTEM DEVICE

CROSS-REFERENCE TO RELATED APPLICATION

This application claims the priority benefit of Taiwan application serial no. 93108815, filed on Mar. 31, 2004.

BACKGROUND OF THE INVENTION

1. Field of the Invention

The present invention relates to a method for setting a global positioning system (GPS) device, and more particularly, to a method for providing a return route for a GPS device.

2. Description of the Related Art

The global positioning system (GPS) is a precise satellite guiding and positioning system developed by the United States. The GPS is composed of a total 26 satellites operating in 6 different tracks in the air. There is a 55-degree difference between each of the satellite tracks mentioned above. Accordingly, the GPS users receive signals from 4~8 satellites at the same time for positioning at a given time anywhere on the earth as long as the satellite signal is not blocked by topography or building regardless of weather conditions.

The GPS was originally used for military purpose only. However, recently the GPS is being applied for public use. For example, by applying the GPS guiding and positioning technology and an antenna installed in a car for receiving signals, a current position and/or a route is displayed on a computer screen according to a database installed in the car, for guiding the driver with a correct driving direction and with various routes in order to reduce the total driving time for arriving at the destination.

FIG. 1 schematically shows a flow chart illustrating a conventional method of setting a route in a GPS device. As shown in the diagram, first, at step S101, a current starting point and a target destination are input into the GPS device. Next, at step S103, a recommended route is planned and provided by the GPS device based on the starting point and the target destination input by the user by which the user can be successfully guided to the destination.

However, under certain circumstances, it is possible that the return route from the destination back to the starting point is exactly opposite, and as described above, the user once again inputs the starting point and the target destination, and the GPS provides a recommended route from the starting point to the target destination (steps S101 and S103). Accordingly, the steps S101 and S103 need to be executed once again for obtaining the return route back to the starting point. Therefore, the GPS takes some time to execute searching and planning all over once again for providing a return route and thereby causing inconvenience to the user. Accordingly, it is highly desirable to improve the operation method of the GPS to make it user-friendlier and thereby providing convenience to the user.

SUMMARY OF THE INVENTION

Accordingly, the present invention is directed to a method of setting a return route in a GPS device. When the starting point and the destination of the return trip are exactly opposite to the original starting point and the destination, the GPS device provides return route by reversing the route from the original starting point to the destination without the need of searching and planning all over once again for providing a new route.

The present invention is also directed to a method of setting a return route in a GPS device, wherein a recommended return route is planned based on the previous recommended route. Thus, the present invention provides greater convenience making the operation of the GPS device user-friendly.

According to an embodiment of the present invention, first, a first starting point and a first end point are input. Next, a first route is provided based on the first starting point and the first end point, and the first starting point, the first end point and the first route are stored. Next, whether or not the first end point is a second starting point and the first starting point is a second end point is determined, wherein when the first end point is the second starting point and the first starting point is the second end point, a return route is provided based on the first route.

According to an embodiment of the present invention, whether or not the car is following the first route is determined, wherein when the car deviates from the first route, the deviated point is automatically set as a first temporary point and a second route is provided based on the first temporary point and the first end point, and the first temporary point is stored. For the return route, when the first end point is the second starting point and the first starting point is the second end point, the first temporary point is deleted.

According to an embodiment of the present invention, the return route may be same or different from the first route.

According to another embodiment of the present invention, first, a first route is stored in the GPS. Next, whether or not the first end point is the second starting point and the first starting point is the second end point is determined, wherein when the first end point is the second starting point and the first starting point is the second end point, a return trip route is provided based on the first route.

In summary, in accordance with the method of automatically setting a return route in a GPS device, according to an embodiment of the present invention, when the starting point and the destination of the return route are exactly opposite to the original starting point and the destination, the GPS automatically searches and compares data stored in the database and provides a return route by reversing the recommended route from the original starting point to the original destination. Thus, the return route can be obtained relatively faster and thereby provide convenience to the GPS device user by making the operation of the GPS device more user-friendlier and also effectively increase efficiency of the GPS device in planning the routes.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION OF EMBODIMENTS

Figure 1:
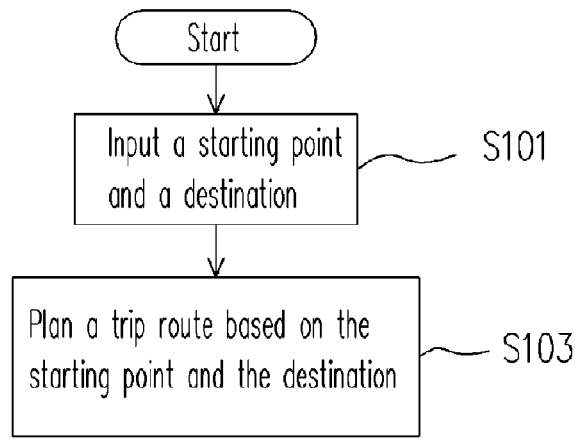
FIG. 1 schematically shows a flow chart illustrating a conventional method of setting a route in a GPS device.
Figure 2:
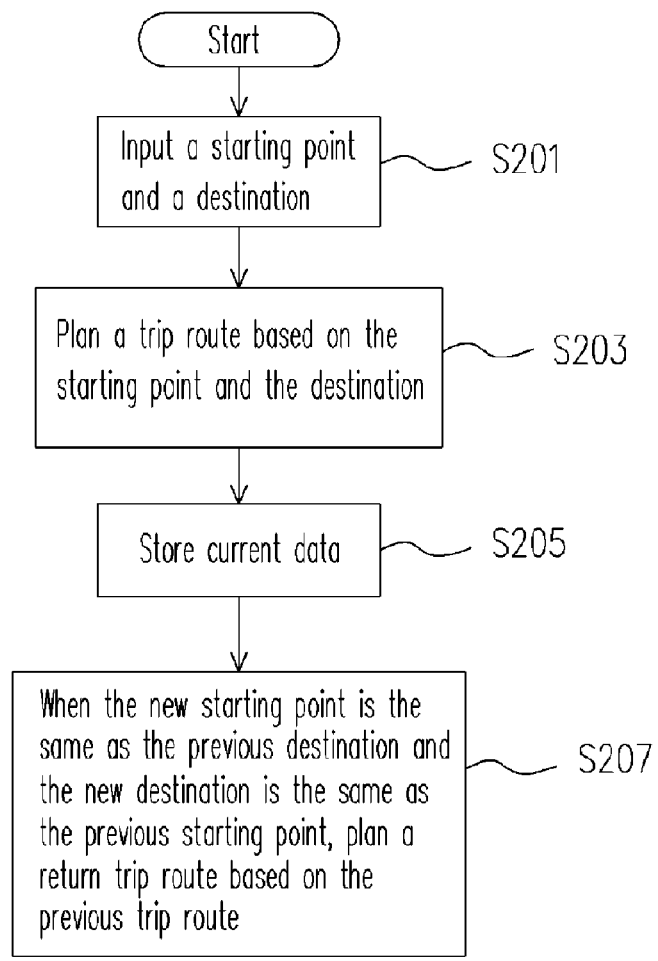
FIG. 2 schematically shows a flow chart illustrating a method of automatically setting a return route in a GPS device according to an embodiment of the present invention.

FIG. 2 schematically shows a flow chart illustrating a method of automatically setting a return route in a GPS device according to an embodiment of the present invention. As shown in FIG. 2, at step S201, a current location, that is a starting point, and a destination are input into the GPS device. Next, at step S203, the GPS device plans and provides a recommended route based on the starting point and the destination for guiding user to the destination. At step S205, the recommended route, the starting point, and the destination are recorded and stored in the GPS device.

At step S207, for requesting a new recommended route on the GPS device once again, the user has to input a new starting point and a new destination once again, and the GPS device searches and compares the newly inputted starting point and the destination point with data previously stored in the database. If it is determined that the new starting point is same as the previously stored destination and the new destination is same as the previously stored starting point, the GPS device provides a return route by merely reversing a previously recommended route from the previously stored starting point to the previously stored destination. Accordingly, the GPS device is capable of providing a new route based on the recommended route previously stored in the database without the need of searching and planning an entirely new route for return trips. Thus, the time required for searching and planning an entirely new route all over again can be effectively reduced.

Of course, it is possible that some of the previously stored recommended routes are being stored to be one-way, thus a route exactly opposite to a previously stored recommended route cannot be planned and provided as return route, the GPS device automatically searches, plans and provides a new recommended route for guiding the user back to the original starting point on the return trip.

In addition, according to the present embodiment, when the user deviates from the original recommended route for some reasons or may forget to turn on a specific point or intend to visit a point of interest during the journey before arriving at the destination, the GPS device replans and provides a new recommended route based on the current position of user and the destination. Accordingly, a problem is occurred due to the difference of the starting point when applying the above method of setting a return route in the GPS device.

In order to resolve this problem, when the user deviates from the recommended route, the GPS device automatically searches, plans and provides another new recommended route from the current deviated point to the destination and configures the current deviated point as a temporary position, and meanwhile the new recommended route is configured as a temporary route. Subsequently, when the user inputs a request for a return route, the GPS device searches and compares data previously stored in the database, and when it is determined that the destination is same as the original starting point, the temporary position and the temporary route are deleted and the GPS device automatically provides a return route, which is exactly reverse of the original recommended route from the original starting point to the destination provided at the original starting point.

In summary, according to an embodiment of the present invention, when the starting point and the destination of the return route are exactly opposite to the starting point and the destination of the original route, the GPS automatically searches and compares data previously stored in the database and provides a return route based on the prior recommended routes. Thus, the present invention provides convenience to the user making the operation of the GPS user-friendlier, and also increases the efficiency of the GPS device.

Although the invention has been described with reference to a particular embodiment thereof, it will be apparent to one of the ordinary skilled in the art that modifications to the described embodiment may be made without departing from the spirit of the invention. Accordingly, the scope of the invention will be defined by the attached claims not by the above detailed description.

What is claimed is:

1. A method of providing a return route for a global positioning system (GPS) device, comprising:
   receiving a first starting point and a first end point;
   planning a first route based on the first starting point and the first end point;
   setting a deviated position as a first temporary point when a user has deviated to the deviated position from the first route;
   storing the first temporary point, the first starting point, the first end point, and the first route;
   receiving a second starting point and a second end point; and
   determining whether or not the first end point is the second starting point and the first starting point is the second end point, wherein when the first end point is the second starting point and the first starting point is the second end point, the first temporary point is deleted and a return route is provided based on the first route.

2. The method of providing a return route for a GPS device according to claim 1, further comprising:
   determining whether or not the user followed the first route; and
   planning and providing a second route from the deviated position to the first end point when the user has deviated to the deviated position from the first route.

3. The method of providing a return route for a GPS device according to claim 1, wherein the first route is same as the return route.

4. The method of providing a return trip route for a GPS device according to claim 1, wherein the first route is different from the return route.

5. A method of providing a return route for a global positioning system (GPS) device comprising at least a first route from a first starting point to a first end point stored in a database thereof, comprising:
   setting a deviated position as a first temporary point when a user has deviated to the deviated position from the first route;
   storing the first temporary point;
   receiving a second starting point and a second end point;
   determining whether or not the second starting point is the first end point and the second end point is the first starting point; and
   deleting the first temporary point and providing a return route based on the first route when the second starting point and the second end point are respectively determined to be the first starting point and the first end point.

6. The method of providing a return route for a GPS device according to claim 5, wherein the first route is same as the return route.

7. The method of providing a return trip route for a GPS device according to claim 5, wherein the first route is different from the return route.

8. The method of providing a return trip route for a GPS device according to claim 5, further comprising:
   determining whether or not the user followed the first route; and
   planning and providing a second route from the deviated position to the first end point when the user has deviated to the deviated position from the first route.

* * * * *